US011552512B2

(12) United States Patent
Humphries et al.

(10) Patent No.: US 11,552,512 B2
(45) Date of Patent: Jan. 10, 2023

(54) AIR GAP BAFFLE TRAIN FOR A ZONE COOLED TURBINE GENERATOR

(71) Applicant: Siemens Energy, Inc., Orlando, FL (US)

(72) Inventors: Benjamin Todd Humphries, Orlando, FL (US); Robert Gore, Sorrento, FL (US)

(73) Assignee: Siemens Energy, Inc., Orlando, FL (US)

( * ) Notice: Subject to any disclaimer, the term of this patent is extended or adjusted under 35 U.S.C. 154(b) by 285 days.

(21) Appl. No.: 17/126,160

(22) Filed: Dec. 18, 2020

(65) Prior Publication Data

US 2022/0200369 A1 Jun. 23, 2022

(51) Int. Cl.
*H02K 1/20* (2006.01)
*H02K 7/18* (2006.01)
*H02K 9/00* (2006.01)
*H02K 9/12* (2006.01)
*H02K 15/02* (2006.01)

(52) U.S. Cl.
CPC ............. *H02K 1/20* (2013.01); *H02K 7/1823* (2013.01); *H02K 9/00* (2013.01); *H02K 9/12* (2013.01); *H02K 15/02* (2013.01)

(58) Field of Classification Search
CPC ............... H02K 9/00; H02K 9/10; H02K 9/02

USPC ....................................... 310/52, 54, 58, 214
See application file for complete search history.

(56) References Cited

U.S. PATENT DOCUMENTS

| | | | | |
|---|---|---|---|---|
| 3,265,912 A | * | 8/1966 | Baudry | H02K 3/24 310/55 |
| 4,751,412 A | * | 6/1988 | Lowther | H02K 9/10 310/55 |
| 2017/0033644 A1 | * | 2/2017 | Humphries | H02K 9/10 |

* cited by examiner

*Primary Examiner* — Jose A Gonzalez Quinones

(57) ABSTRACT

A generator air gap baffle train assembly includes linearly aligned baffle segments, linearly aligned wedge blocks, and a tensioning rod. Each baffle segment includes a radially outer portion having an outer surface to interface with the axial slot and a side surface angled with respect to the outer surface and an axially aligned first thru bore and a radially inner portion which projects into an air gap. A pair of wedge blocks are positioned on opposing sides of the radially outer portion, each wedge block including a side surface that interfaces with the side surface of the radially outer portion so that the interfacing surfaces are in abutting contact and an outer surface that interfaces with the axial slot and a second thru bore axially aligned with the first thru bore of each baffle segment. The tensioning rod is enclosed by a non-conducting hollow tube spanning between adjacent baffle segments.

14 Claims, 7 Drawing Sheets

AIR GAP BAFFLE TRAIN FOR A ZONE COOLED TURBINE GENERATOR

BACKGROUND

Turbine generators employ internal air cooling systems to circulate cooling air within the machine. The cooling scheme of some generators requires the stator core be separated into different cooling zones. A plurality of axially aligned composite airflow baffles circumscribe the stator bore and establish cooling airflow zones in an air gap between the stator bore and the rotor that are bounded by the composite airflow baffles. These rings of airflow baffles should be able to be inserted after the rotor is installed in the machine.

BRIEF SUMMARY

In one construction, an air gap baffle train assembly for a generator is presented. The generator includes a stator bore and a rotor. An annular air gap is defined between the stator bore and the rotor. The stator bore includes at least one axial slot. The air gap baffle train assembly includes a plurality of linearly aligned baffle segments, a plurality of linearly aligned wedge blocks, and a tensioning rod. Each baffle segment of the plurality of baffle segments includes a radially outer portion having an outer baffle segment surface to interface with the axial slot and a baffle segment side surface angled with respect to the outer baffle segment surface and an axially aligned first thru bore and a radially inner portion which projects into the annular air gap. A pair of wedge blocks of the plurality of wedge blocks are positioned on opposing sides of the radially outer portion, each wedge block of the pair including a wedge block side surface that interfaces with the baffle segment side surface of the radially outer portion so that the interfacing surfaces are in abutting contact and an outer wedge block surface that interfaces with the axial slot and a second thru bore axially aligned with the first thru bore of each baffle segment. The tensioning rod is enclosed by a non-conducting hollow tube spanning between adjacent baffle segments, the tensioning rod received by and extending within the first thru bore and the second thru bore.

In another construction, an adjustable air gap baffle train assembly for a generator is presented. The generator includes a stator bore and a rotor. An annular air gap defined between the stator bore and the rotor, the stator bore includes at least one an axial slot. The air gap baffle train assembly includes a plurality of linearly aligned baffle segments. Each baffle segment includes a radially outer portion having a radially outer baffle segment surface to interface with the axial slot and a baffle segment side surface angled with respect to the outer baffle segment surface, the radially outer portion including an axially aligned first thru bore, and a radially inner portion which projects into the annular air gap. The air gap baffle train assembly also includes a plurality of linearly aligned wedge blocks. A pair of wedge blocks of the plurality of wedge blocks are positioned on opposing sides of the radially outer portion. Each wedge block of the pair includes a wedge block side surface that interfaces with the baffle segment side surface so that the interfacing surfaces are in abutting contact and a radially outer wedge block surface that interfaces with the axial slot, and a second thru bore axially aligned with the first thru bore of the baffle segment. The air gap baffle train also includes a tensioning rod received by and extending within the first thru bores and the second thru bores.

In a further construction, a generator is presented. The generator includes an annular stator core having a stator bore with at least one axial slot circumferentially aligned around the stator bore, a rotor positioned to rotate within the stator bore, an annular air gap defined between the rotor and the stator bore, and an air gap baffle train assembly. The air gap baffle train assembly located within the axial slot and includes a plurality of linearly aligned baffle segments. Each baffle segment includes a radially outer portion having a radially outer baffle segment surface that interfaces with the axial slot and a baffle segment side surface angled with respect to the radially outer baffle segment surface and an axially aligned first thru bore and a radially inner portion which projects into the annular air gap. The air gap baffle train also includes a plurality of wedge blocks linearly aligned, a pair of wedge blocks of the plurality of wedge blocks positioned on opposing sides of the radially outer portion, each wedge block including a wedge block side surface that interfaces with the baffle segment side surface so that the interfacing surfaces are in abutting contact and a radially outer wedge block surface that interfaces with the axial slot and a second thru bore axially aligned with the first thru bore of the baffle segment. The air gap baffle train also includes a tensioning rod enclosed by a non-conducting hollow tube spanning between adjacent baffle segments, the tensioning rod received by and extending within the first thru bores and the second thru bores.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
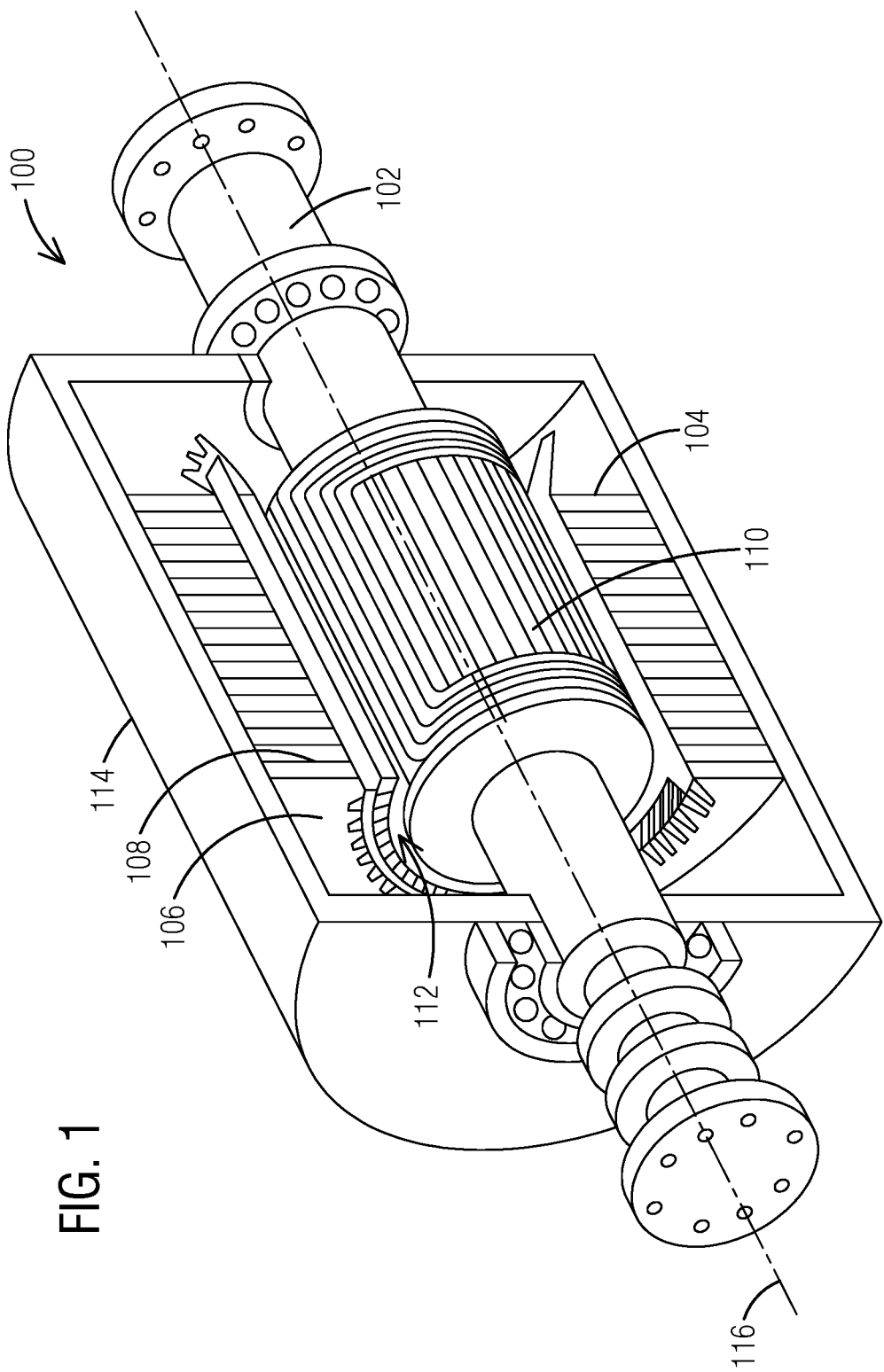
FIG. 1 is a perspective partially sectioned view of a generator including a stator and a rotor.

FIG. 1 illustrates a generator 100 that includes a rotor 102 supported for rotation about a longitudinal or central axis 116. The rotor 102 is positioned within a stator 104 and cooperates with the stator 104 to define an annular air gap 112. The stator 104 is generally enclosed within a housing 114 that protects the stator 104 from the external environment.

The rotor 102 includes rotor windings 110 that are arranged around the rotor 102 and that are operable to generate a magnetic field when energized.

The stator includes a plurality of laminations 106 that are stacked along the central axis 116 to define a stator core. An insulating layer 108 is typically positioned between each of the laminations 106 and acts to inhibit the flow of unwanted electrical currents between the laminations 106.

Figure 2:
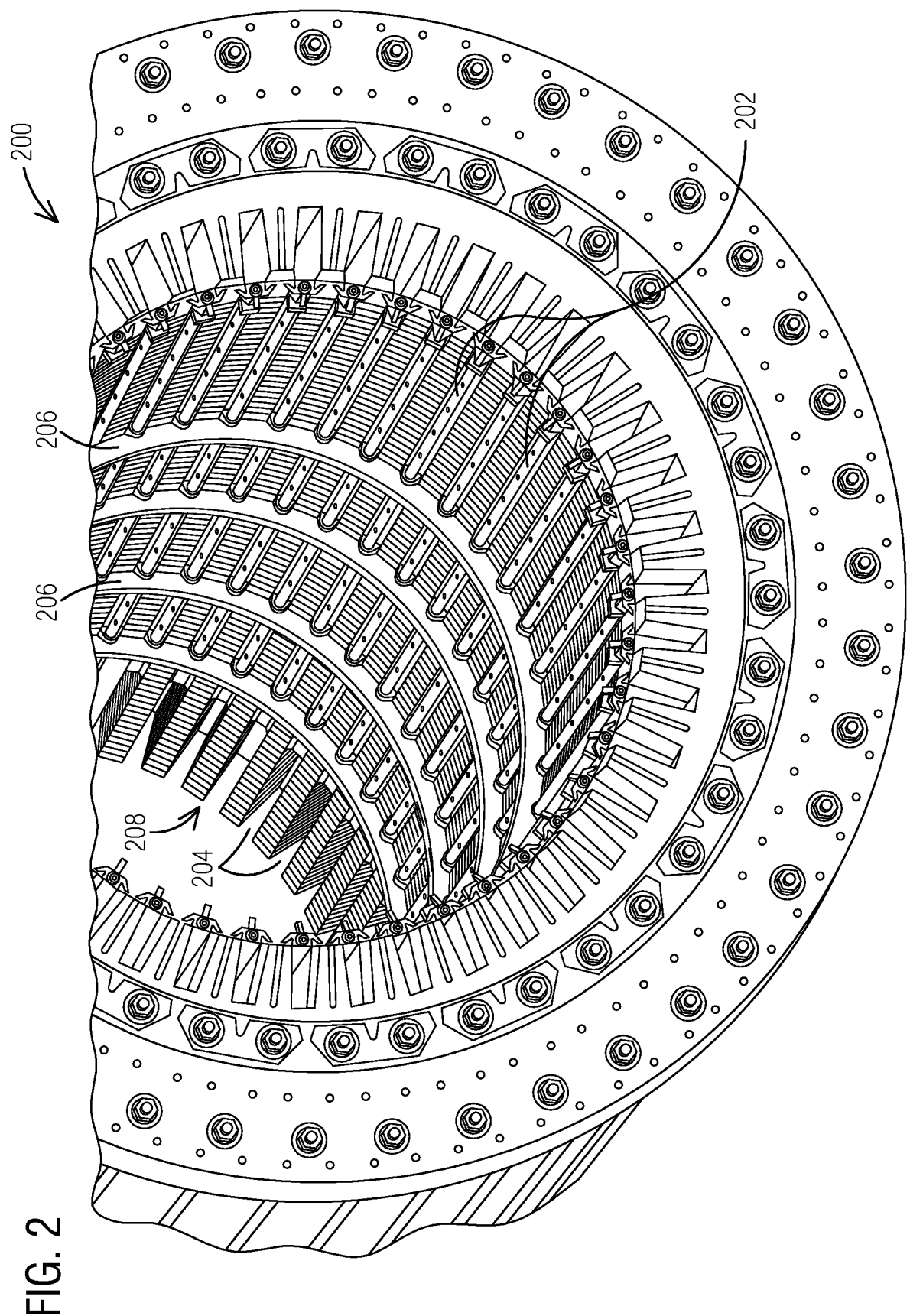
FIG. 2 is a partial perspective view of a stator core for a turbine generator with air gap baffle trains.

FIG. 2 is a partial perspective view of a stator core 200 for a high voltage generator 100, where the stator core 200 is shown separated from an inner frame of the generator 100. The stator core 200 includes a plurality of axial slots 204 circumferentially aligned about a stator bore 208 in which a rotor (not shown) may be positioned in a manner well understood by those skilled in the art. Among other places within the generator 100, cooling air flows within an annular air gap 112 (shown in FIG. 1) between the stator core 200 and the rotor 102. A plurality of air gap baffle trains 202 are oriented in respective axial slots 204 about the stator bore 208 circumference and establish cooling airflow zones in the air gap 102 between the stator core 200 and the rotor 102. The airflow zones are created by composite airflow baffles 206 formed when the air gap baffle trains 202 are axially aligned about the circumference of the stator bore 208.

Figure 3:
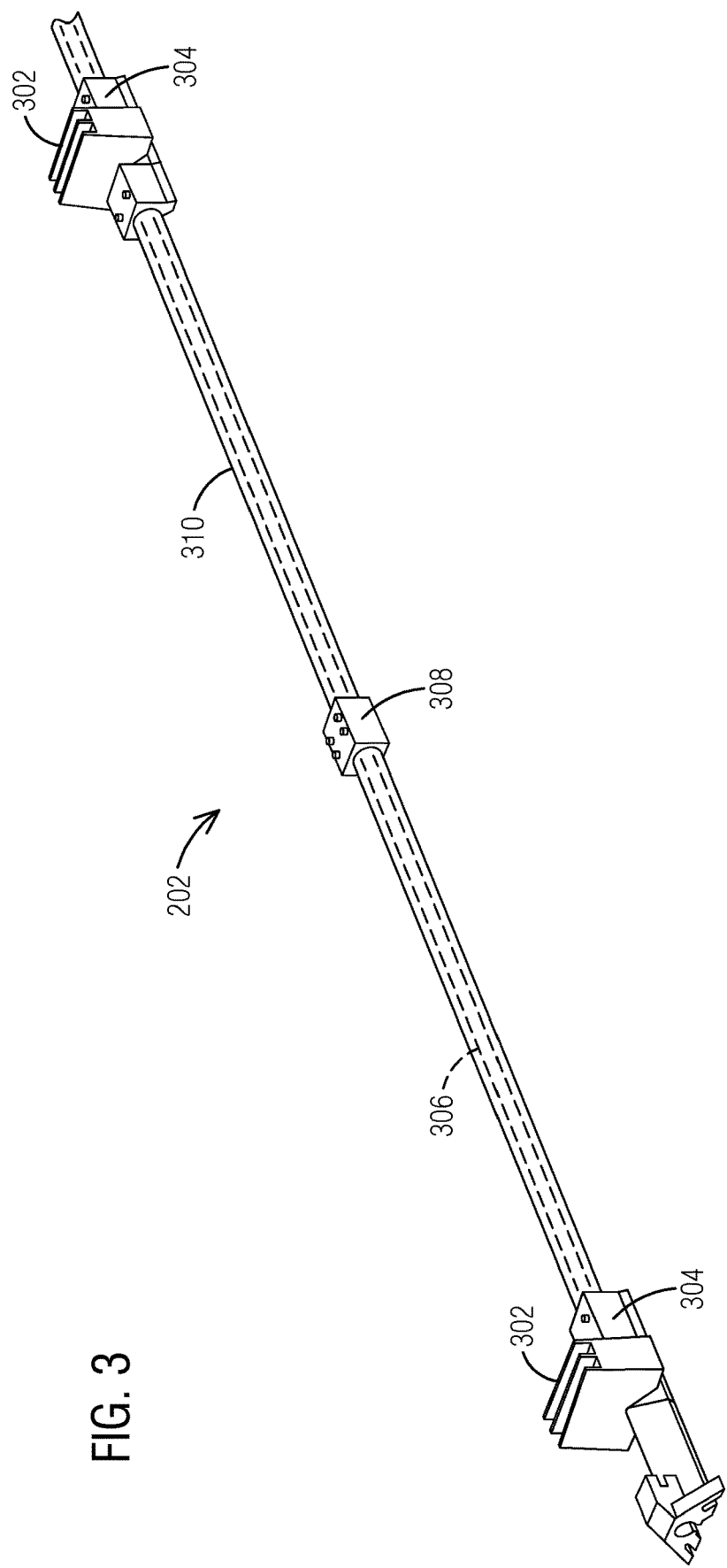
FIG. 3 is a perspective view of an embodiment of an air gap baffle train.

FIG. 3 illustrates a perspective view of an air gap baffle train 202. The air gap baffle train 202 includes linearly aligned baffle segments 302 that when axially aligned with adjoining baffle segments 302 from other air gap baffle trains 202, oriented in a corresponding stator axial slots 104 about the stator bore 208 circumference, form the composite airflow baffles 206. A radially outer surface of each baffle segment 302 interfaces with the corresponding axial slot 104.

In an embodiment, the air gap baffle train 202 includes wedge blocks 304, a pair of wedge blocks 304 linearly arranged and positioned on opposing sides of the baffle segments 302. Each of the baffle segments 302 as well as each of the wedge blocks 304 includes axially aligned thru bores, through which a tensioning rod 306 extends. The tensioning rod 306 extends the length of the air gap baffle train 202 from a first end to a second end. In an embodiment, the tensioning rod 306 comprises a non-magnetic stainless steel. Each air gap baffle train 202 is installed by sliding it longitudinally into its corresponding axial slot 204 within the stator bore 208 with the generator rotor 102 in place.

Figure 4:
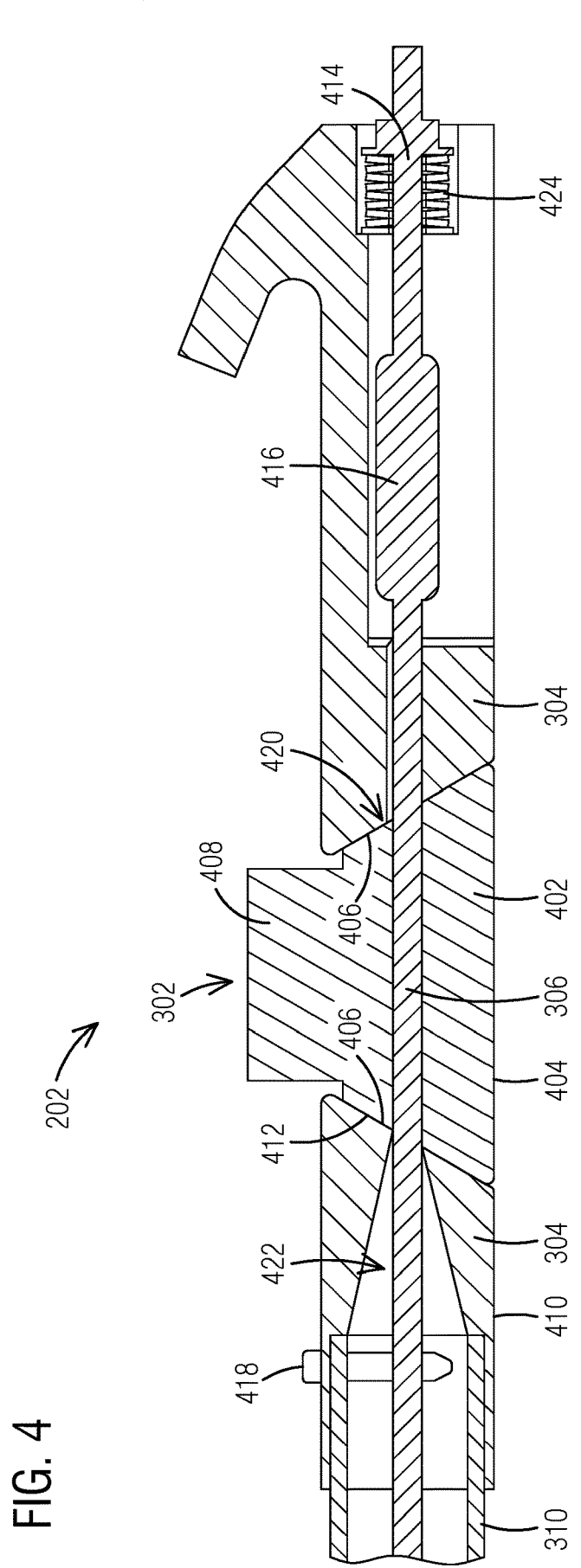
FIG. 4 is longitudinal cross-sectional view of a portion of an air gap baffle train.

The tensioning rod 306 as shown in FIG. 3 is enclosed by a non-conducting hollow tube 310 extending between adjacent baffle segments 302. In an embodiment, the hollow tube 310 is a hollow epoxy glass hollow tube. The hollow tube 310 carries the compressive load applied by the tensioning rod 306. The hollow tube 310 may be received by a wedge block 304 on each end and attached to the wedge block 304 by a fastener 418 as shown in FIG. 4. A coupler 308 may be positioned on the air gap baffle train 202 in order to couple together two hollow tubes 310 together to create a hollow tube 310 of a desired length when one hollow tube 310 is not of sufficient length.

FIG. 4 illustrates a longitudinal cross-sectional view of an end portion of the air gap baffle train 202. Only one baffle segment 302 is shown, but the air gap baffle train 202 may include a plurality of baffle segments 302 linearly aligned. Each baffle segment 302 includes a radially outer portion 402 having a radially outer baffle segment surface 404 that interfaces with the corresponding axial slot 204. The baffle segment 302 may be wedge-shaped such that it has two baffle segment side surfaces 406 that are angled with respect to the radially outer baffle segment surface 404. The outer portion 402 includes a first thru bore 420 through which the tensioning rod 306 extends. Each baffle segment 302 includes a radially inner portion 408 that projects into the air gap 112 defined between the stator bore 208 and the rotor 102 when installed in the axial slot 204. The radially inner portions 408 of circumferentially adjoining air gap baffle trains 202 in combination form the composite baffle 206 and establish the airflow cooling zones in the air gap 112. Each baffle segment 302 may be constructed of a cotton phenolic material.

The air gap baffle train 202 shown in FIG. 4 also illustrates a pair of wedge blocks 304 positioned on opposing sides of the radially outer portion 402 of the baffle segment 302. The wedge blocks 304 are in linear alignment with the baffle segments 302. Each wedge block 304 includes a radially outer wedge block surface 410 that interfaces with the axial slot 204. Each wedge block 304 also includes an angled wedge block side surface 412, angled with respect to the outer wedge block surface 410, that interfaces with a corresponding baffle segment side surface 406 such that the interfacing surfaces are in abutting contact. The wedge block 304 includes a second thru bore 422 axially aligned with the first thru bore 420 of the adjacent baffle segment 302 through which the tensioning rod 306 extends. The wedge block 304 on the right side of FIG. 4 is an end wedge block 304 positioned at the first end of the air gap baffle train 202, however, the pair of wedge blocks 304 may be disposed in a central portion of the air gap baffle train 202 and comprise two symmetrical wedge blocks 304 on opposing sides of a baffle segment 302. The wedge blocks 304 may be constructed of a cotton phenolic material.

At an axial end of the air gap baffle train 202, a threaded fastener 414 may be used to apply a compressive force to the assembly. This is accomplished by tensioning the tensioning rod 306. When the threaded fastener 414 is turned against the tensioning rod 306, thereby tensioning the tensioning rod 306, the interfacing sides of the wedge blocks 304 and the baffle segments 302, wedge block side surfaces 412 and baffle segment side surfaces 406 respectively, slide against one another from a first position to a second position locking the air gap baffle train 202 within the respective axial slot 204. The threaded fastener 414 may include a biasing member 424 in order to support the load applied to the tensioning rod 306.

Figure 5:
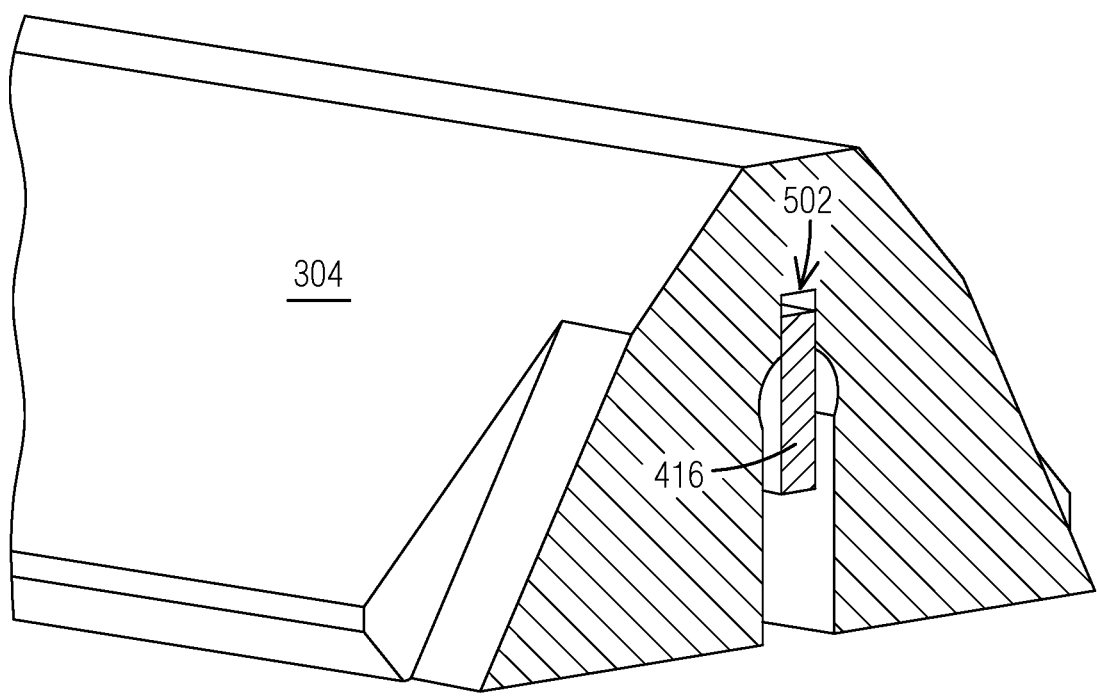
FIG. 5 is a perspective cut away view of a wedge block including an anti-rotation tab.

The tensioning rod 306 may also include an anti-rotation tab 416 at a position along the tensioning rod 306 as shown in FIG. 4. As shown in FIG. 5, the anti-rotation tab 416 extends radially outward from the tensioning rod 306 and is positioned to be inserted in a slot 502 within a corresponding wedge block 304. The anti-rotation tab 416 prevents rotation of the tensioning rod 306 when a torque is applied to the threaded fastener 414.

Figure 6:
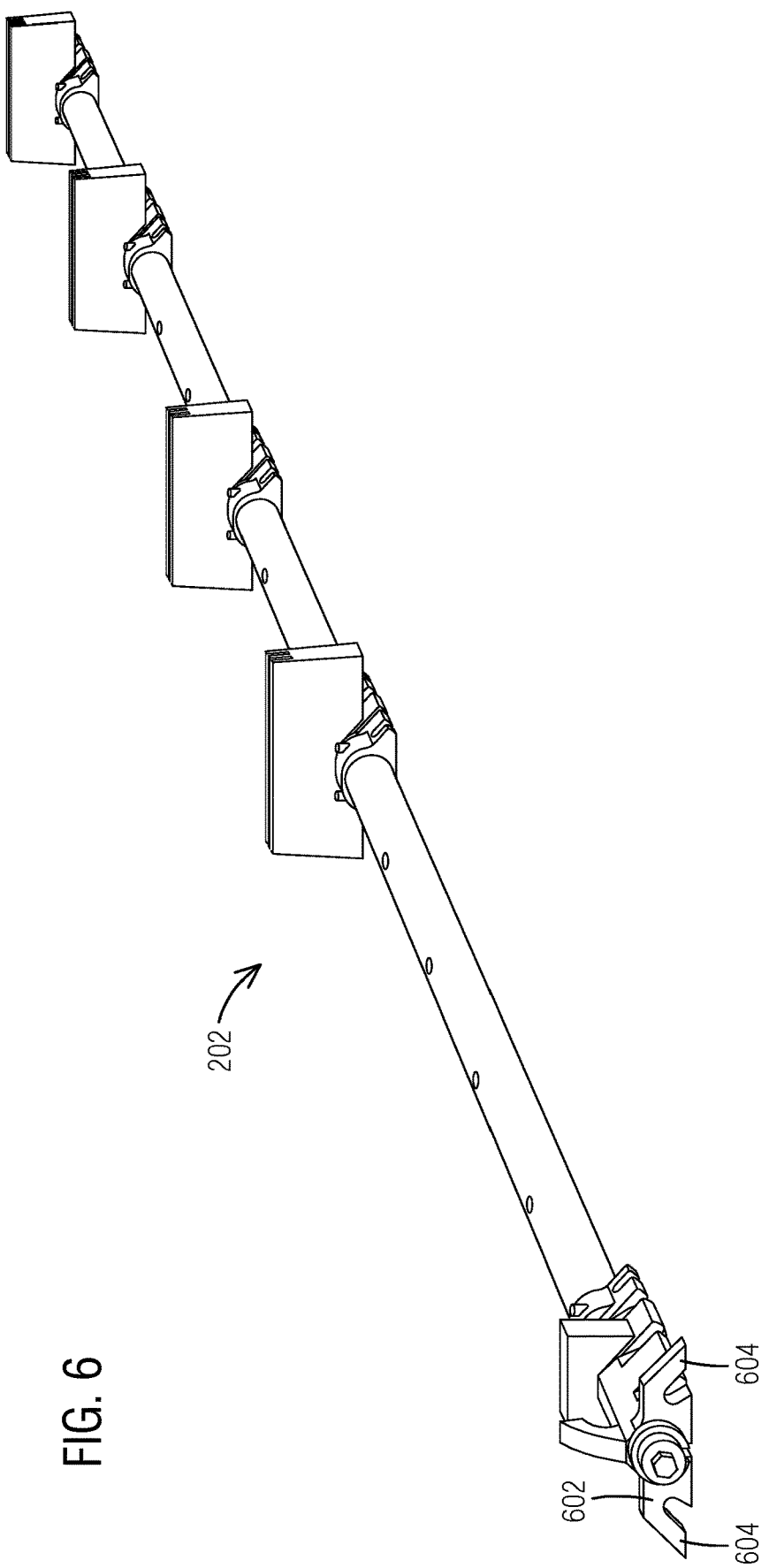
FIG. 6 is a perspective view of an air gap baffle train with a spacing element.

FIG. 6 shows a perspective view of the air gap baffle train 202 with a spacer element 602 at an axial end of the air gap baffle train 202. The spacer element 602 includes an outer surface that interfaces with the axial slot 204 and includes locating feet 604. The spacer element 602 locates the air gap baffle train 202 axially within the stator core 200 using the locating feet 604 to interface with a step iron at an exciter end of the stator core 200. Thus, the spacer element 602 can correctly position the baffle segments 302 within the axial slot 204 in order to axially align each individual baffle segment 302 with its adjacent baffle segments 302 forming the composite baffle 206.

Figure 7:
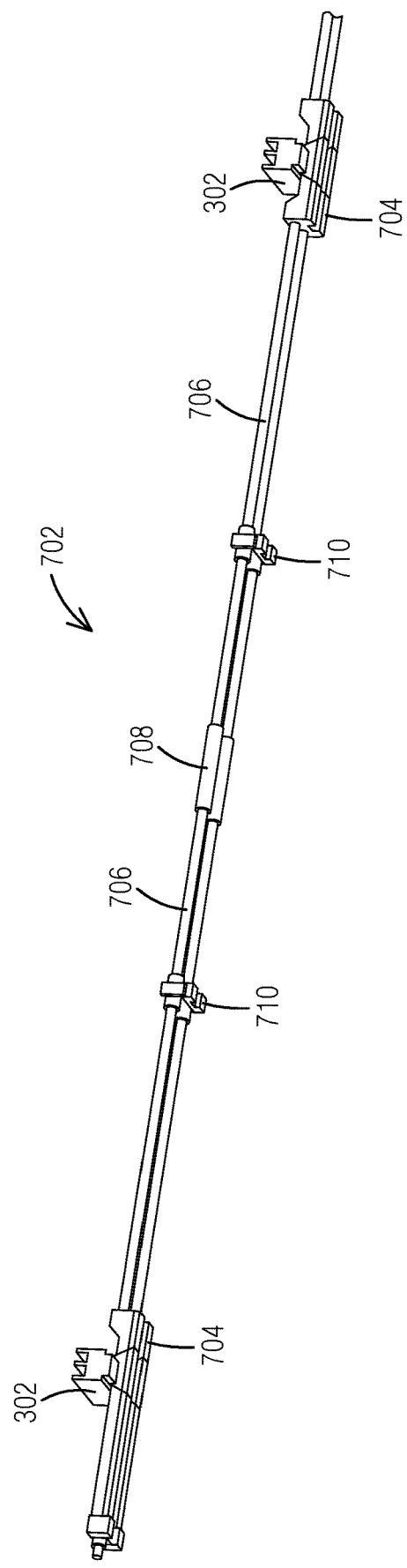
FIG. 7 is a perspective view of a further embodiment of an air gap baffle train.

FIG. 7 illustrates a further embodiment of the air gap baffle train such that a length of air gap baffle train is adjustable. The adjustable air gap baffle train 702 includes baffle segments 302 having threaded wedge blocks 704 on opposing sides of the radially outer portions 402 of the baffle segments 302 which slide against one another to lock the adjustable air gap baffle train 702 in the same manner as the air gap baffle train 202 described above. However, instead of using a hollow tube between the baffle segments 302, the adjustable air gap baffle train 702, includes a design that has a body section between the baffle segments 302 featuring threaded studs 706, internally threaded fasteners 708, and anti-buckling blocks 710. The tensioning rod 306 passes between the threaded studs 706.

The adjustable air gap baffle train 702 includes a pair of threaded studs 706 engaging a threaded wedge block 704 on one end and an internally threaded fastener 708 on an opposite end, the internally threaded fastener 708 is disposed between adjacent baffle segments 302. In this embodiment, the tensioning rod 306 has a threaded stud 706 on each of two sides but is exposed on the remaining sides. In an embodiment, the threaded studs 706 comprise epoxy glass.

In order to axially locate the baffle segments 302, the threaded studs 706 and the internally threaded fasteners 708 are used. The internally threaded fastener 708 may be adjusted so that the threaded studs 706 move from a first position where the air gap baffle train has a first length to a second position wherein the adjustable air gap baffle train 702 has a second length.

An anti-buckling block 710 may be disposed along the length of the adjustable air gap baffle train 702. In the embodiment shown in FIG. 7, two anti-buckling blocks 710 are disposed between adjacent baffle segments 302, one on either side of the internally threaded fastener 708. Depending on the diameter and length of the threaded studs 706, the threaded studs 706 may be subject to buckling when placed in compression along their longitudinal axis, i.e., when the adjustable air gap baffle train 702 is loaded. The anti-buckling block 710 may be used to prevent the threaded studs 706 from buckling.

In summary, embodiments of an air gap baffle train have been presented. One embodiment utilizes a hollow tube spanning between adjacent baffle segments that carries the compressive load applied by the tensioning rod. Another embodiment is adjustable by adjusting an internally threaded fastener so that a length of the air gap baffle train is adjusted. Both embodiments use a threaded fastener on the tensioning rod to allow for easy tensioning once installed.

The proposed air gap baffle train is configured to work with a fast wedge stator coil wedge system on large hydrogen cooled generator stator cores. Compared to currently used air gap baffle trains, the air gap baffle train embodiments described above are easier to install and take less time to install. The new designs may also be installed with standard tools instead of tools specifically designed to install the air gap baffle trains.

What is claimed is:

1. An air gap baffle train assembly for a generator having a stator bore and a rotor, an annular air gap defined between the stator bore and the rotor, the stator bore including an axial slot, the assembly comprising:
 a plurality of baffle segments linearly aligned, each baffle segment including a radially outer portion having a radially outer baffle segment surface to interface with the axial slot and a baffle segment side surface angled with respect to the outer baffle segment surface and an axially aligned first thru bore, and a radially inner portion which projects into the annular air gap;
 a plurality of wedge blocks linearly aligned, a pair of wedge blocks of the plurality of wedge blocks positioned on opposing sides of the radially outer portion, each wedge block of the pair including a wedge block side surface that interfaces with the baffle segment side surface of the radially outer portion so that the interfacing surfaces are in abutting contact and a radially outer wedge block surface that interfaces with the axial slot and a second thru bore axially aligned with the first thru bore of each baffle segment; and
 a tensioning rod enclosed by a non-conducting hollow tube spanning between adjacent baffle segments, the tensioning rod received by and extending within the first thru bore and the second thru bore.

2. The air gap baffle train of claim 1, wherein a first axial end of the air gap baffle train includes a threaded fastener for tensioning the tensioning rod, wherein when the tensioning rod is tensioned the interfacing surfaces slide on one another from a first position to a second position relative to one another.

3. The air gap baffle train of claim 2, wherein the threaded fastener includes a biasing member.

4. The air gap baffle train of claim 1, further comprising a spacer element to define an axial position of the plurality of baffle segments within the axial slot and wherein a surface of the spacing element interfaces with the axial slot.

5. The air gap baffle train of claim 1, wherein the hollow tube is a hollow epoxy glass tube.

6. The air gap baffle train of claim 5, wherein a wedge block of the plurality of wedge blocks receives an end of the hollow epoxy glass tube.

7. The air gap baffle train of claim 1, wherein the tensioning rod further comprises an anti-rotation tab at a position along the length of the tensioning rod, the anti-rotation tab extending radially outward and sized to be inserted into a slot in a corresponding wedge block of the plurality of wedge blocks.

8. The air gap baffle train of claim 1, wherein the tensioning rod comprises a non-magnetic stainless steel.

9. An adjustable air gap baffle train assembly for a generator having a stator bore and a rotor, an annular air gap defined between the stator bore and the rotor, the stator bore including an axial slot, the assembly comprising:
 a plurality of baffle segments linearly aligned, each baffle segment including:
  a radially outer portion having a radially outer baffle segment surface to interface with the axial slot and a baffle segment side surface angled with respect to the outer baffle segment surface, the radially outer portion including an axially aligned first thru bore, and
  a radially inner portion which projects into the air gap;
 a plurality of wedge blocks linearly aligned, a pair of wedge blocks of the plurality of wedge blocks positioned on opposing sides of the radially outer portion, each wedge block of the pair including:
  a wedge block side surface that interfaces with the baffle segment side surface so that the interfacing surfaces are in abutting contact and a radially outer wedge block surface that interfaces with the axial slot, and
  a second thru bore axially aligned with the first thru bore of the baffle segment; and
 a tensioning rod received by and extending within the first thru bores and the second thru bores.

10. The adjustable air gap baffle train of claim 9, wherein a first axial end of the air gap baffle train includes a threaded fastener for tensioning the tensioning rod, wherein when the tensioning rod is tensioned the interfacing surfaces slide on one another from a first position to a second position relative to one another.

11. The adjustable air gap baffle train of claim 9, further comprising a pair of threaded studs engaging a threaded wedge block on one end and an internally threaded fastener on an opposite end, the internally threaded fastener is disposed between adjacent baffle segments, wherein the pair of threaded studs movable between a first position where the air gap baffle train has a first length and a second position where the air gap baffle train has a second length, and wherein the tensioning rod passes between the pair of threaded studs.

12. The adjustable air gap baffle train of claim 11, wherein the pair of threaded studs comprise epoxy glass.

13. The adjustable air gap baffle train of claim 9, further comprising an anti-buckling block disposed along the length of the pair of threaded studs so that the pair of threaded studs pass through the anti-buckling block, and wherein the anti-buckling block includes a radially outer surface that interfaces with the axial slot.

14. A generator, comprising:
an annular stator core including a stator bore with an axial slot circumferentially aligned around the stator bore;
a rotor positioned to rotate within the stator bore;
an annular air gap defined between the rotor and the stator bore;
an air gap baffle train assembly according to claim 1, the air gap baffle train assembly located within the axial slot and comprising:
a plurality of baffle segments linearly aligned, each baffle segment including a radially outer portion having a radially outer baffle segment surface that interfaces with the axial slot and a baffle segment side surface angled with respect to the radially outer baffle segment surface and an axially aligned first thru bore, and a radially inner portion which projects into the annular air gap;
a plurality of wedge blocks linearly aligned, a pair of wedge blocks of the plurality of wedge blocks positioned on opposing sides of the radially outer portion, each wedge block including a wedge block side surface that interfaces with the baffle segment side surface so that the interfacing surfaces are in abutting contact and a radially outer wedge block surface that interfaces with the axial slot and a second thru bore axially aligned with the first thru bore of the baffle segment; and
a tensioning rod enclosed by a non-conducting hollow tube spanning between adjacent baffle segments, the tensioning rod received by and extending within the first thru bores and the second thru bores.

\* \* \* \* \*